(12) United States Patent
Desserouer

(10) Patent No.: US 8,934,171 B2
(45) Date of Patent: Jan. 13, 2015

(54) PLANAR OPTICAL SYSTEM FOR WIDE FIELD-OF-VIEW POLYCHROMATIC IMAGING

(75) Inventor: Frédéric Desserouer, Palaiseau (FR)

(73) Assignee: Horiba Jobin Yvon SAS, Longjumeau (FR)

( * ) Notice: Subject to any disclaimer, the term of this patent is extended or adjusted under 35 U.S.C. 154(b) by 45 days.

(21) Appl. No.: 13/388,154

(22) PCT Filed: Jul. 29, 2010

(86) PCT No.: PCT/FR2010/051622
§ 371 (c)(1),
(2), (4) Date: Jan. 31, 2012

(87) PCT Pub. No.: WO2011/012825
PCT Pub. Date: Feb. 3, 2011

(65) Prior Publication Data
US 2012/0127577 A1 May 24, 2012

(30) Foreign Application Priority Data
Jul. 31, 2009 (FR) ...................................... 09 55397

(51) Int. Cl.
*G02B 5/18* (2006.01)
*G02B 27/01* (2006.01)
(Continued)

(52) U.S. Cl.
CPC .......... *G02B 27/0101* (2013.01); *G02B 5/1861* (2013.01); *G02B 27/0037* (2013.01); *G02B 5/18* (2013.01); *G02B 6/0011* (2013.01); *G02B 2027/0112* (2013.01)

USPC ........................... 359/569; 359/572; 359/566

(58) Field of Classification Search
CPC ... G02B 5/1814; G02B 5/1861; G02B 5/1866
USPC ......................................................... 359/566
See application file for complete search history.

(56) References Cited

U.S. PATENT DOCUMENTS

| 5,070,488 A | 12/1991 | Fukushima et al. |
| 5,315,676 A | 5/1994 | Sunagawa |

(Continued)

OTHER PUBLICATIONS

International search report dated Nov. 5, 2010 in corresponding PCT/FR2010/051622.

(Continued)

*Primary Examiner* — Thomas K Pham
*Assistant Examiner* — Marin Pichler
(74) *Attorney, Agent, or Firm* — Young & Thompson

(57) ABSTRACT

A planar optical system for wide field-of-view polychromatic imaging includes a planar waveguide including two plane parallel faces, an entry coupler including a first diffraction grating, and an exit coupler including a second diffraction grating. The diffraction gratings are low line density diffraction gratings that have a pitch greater than the wavelength of use such that the grating is adapted to couple an entry beam having a mean angle of incidence $i_0$ ranging between 30 to 60 degrees into the waveguide by positive first order (+1) diffraction, the coupled beam defining an internal angle of incidence greater than the angle of total internal reflection and less than $\gamma=80$ degrees, and the second grating is adapted to receive the coupled beam and to diffract it out of the waveguide by negative first order (−1) diffraction at a mean exit angle $i_1$ ranging between 30 to 60 degrees.

14 Claims, 5 Drawing Sheets

(51) Int. Cl.
*G02B 27/00* (2006.01)
*F21V 8/00* (2006.01)

(56) References Cited

U.S. PATENT DOCUMENTS

| | | | |
|---|---|---|---|
| 6,757,105 B2* | 6/2004 | Niv et al. | 359/569 |
| 2003/0202247 A1 | 10/2003 | Niv et al. | |
| 2005/0002611 A1 | 1/2005 | Levola | |
| 2008/0043334 A1* | 2/2008 | Itzkovitch et al. | 359/569 |
| 2008/0138013 A1* | 6/2008 | Parriaux | 385/37 |
| 2010/0177388 A1* | 7/2010 | Cohen et al. | 359/566 |

OTHER PUBLICATIONS

Parriaux 0 et al: "Waveguide excitation by a Gaussian beam and a finite size grating", Sensors and Actuators B, Elsevier Sequoia S.A., Lausanne, CH LNKD-00I:I0.I016/S0925-4005(97)80273-0, vol. 41, No. 1-3, Jun. 30, 1997, pp. 23-29, XP004091202.

Fumihiro Sogawa et al: "Fabrication of Aberration-Free Focusing Grating Couplers", Applied Optics, Optical Society of America, US, vol. 29, No. 34, Dec. 1, 1990, pp. 5103-5105, XP000165713.

* cited by examiner

PLANAR OPTICAL SYSTEM FOR WIDE FIELD-OF-VIEW POLYCHROMATIC IMAGING

The present invention relates to a compact optical device for transporting wide field-of-view polychromatic images. One application of this device is to a head-up display device that enables a user to look in one direction and see both a projected image and the surroundings. Such devices are used in particular in infantry or pilot helmets or in virtual reality systems so that the user may view useful information while keeping the head up.

Transport devices exist based on the use of a waveguide in which an image beam is coupled into the waveguide, for example via entry/exit couplers based on diffraction gratings.

Thus the document U.S. Pat. No. 4,711,512 (Upatnieks) describes a device including a planar waveguide and entry and exit couplers based on diffraction gratings.

FIG. 1 shows diagrammatically the structure of a prior art image transport system using a planar waveguide. The system shown in FIG. 1 includes an entry grating and an exit grating, both gratings operating in reflection. However, all combinations of transmission and reflection entry/exit gratings are feasible. The directions of the entry beam and the exit beam are generally at an angle of approximately 90° to the planar waveguide, in other words at a zero mean angle of incidence relative to the normal to a plane surface of the waveguide.

The operating principle of the device shown in FIG. 1 is as follows. A source object 11 is at the focus of a collimator optical system 12. An image of the object is therefore formed at infinity, i.e. each object point there corresponds to one angular direction. For a central point of the object all the plane waves 6a, 6b, 6c generated enter the waveguide 3. The line 6a shows a beam on the optical axis of the lens 12, which enters the planar waveguide at zero angle of incidence. The beams 6a and 6b represent the angular aperture of the entry beam for the same central point. A first or entry diffraction grating 1 diffracts all the beams with a mean direction greater than the angle of total reflection in the waveguide. The function of the first grating is to couple the incident beam into the waveguide in order to enable it to propagate along the waveguide by one or more total internal reflections (beams 7a, 7b, 7c, and 8a, 8b, 8c). A second or exit diffraction grating 2 enables the beams 9a, 9b, 9c to be extracted from the waveguide. The two gratings 1, 2 advantageously have the same density of lines, which ensures diffraction with exit angles strictly equal to the entry angles and enables the system to produce an image. The eye (or any other focusing device) then enables the image to be produced on the retina (or any other detector). Since the mean directions of the entry beam and of the exit beam are parallel to each other, the entry beams 6, 6a, 6b and the exit beams 9, 9a, 9b of the waveguide propagate in the same direction or in opposite directions, thus enabling a light beam to be bent or shifted laterally.

The waveguide device is an afocal device of unity angular magnification; it needs to operate over a certain range of angles, i.e. the incoming plane waves need to have angles of incidence varying over a range of $\pm \Delta\theta$ about a zero mean angle of incidence. This range of angles is given for example by the usable visual field of the eye, i.e. typically a total field of around 20 to 30 degrees.

If color images are to be produced, the system must also operate over a wide spectral range from a wavelength $\lambda_1$ to a wavelength $\lambda_3$ with a central wavelength $\lambda_2$.

Prior art systems have severe spectral and angular operating limitations. In fact, for the system to function, there are certain conditions that must be met for any angle of incidence in the range of angles and for any wavelength in the spectrum:
  the condition of total internal reflection in the waveguide;
  the existence of a diffraction order at the first grating with an angle of diffraction of the diffracted beam coupled into the planar waveguide that is less than a limit angle of diffraction $\gamma$ of approximately 80 degrees.

Moreover, for an image transport device:
  the grating must be efficient at the diffraction order used;
  the densities of grating lines must be as high as possible, and the grating must function only in the first diffraction order in order to prevent spurious images from other diffraction orders.

If the above constraints are applied for a waveguide of index $\underline{n}$, functioning at an angle of incidence in the range $-\Delta\theta$ to $+\Delta\theta$ over a spectral range $\Delta\lambda = \lambda_3 - \lambda_1$ with a limit angle of incidence $\gamma$ in the waveguide, the following minimum and maximum grating line densities are obtained:

$$N_{min} = \frac{1 + \sin(\Delta\theta)}{\lambda_1}$$

$$N_{max} = \frac{n * \sin(\gamma) - \sin(\Delta\theta)}{\lambda_3}$$

There can be a solution only if $N_{max} > N_{min}$, which is reflected in the following condition on the index of the waveguide:

$$n \geq \frac{\frac{\lambda_3}{\lambda_1}(1 + \sin(\Delta\theta)) + \sin(\Delta\theta)}{\sin(\gamma)}$$

In this situation, a mean grating line density may be chosen:

$$N = \frac{N_{max} + N_{min}}{2}$$

Applying the above formulas for a full color system from red to blue: $\lambda_1 = 450$ nanometers (nm), $\lambda_3 = 630$ nm with a field $\Delta\theta$ of 15 degrees (i.e. a total angular field of 30 degrees) and a limit angle $\gamma$ equal to 80 degrees gives:

$$n > \frac{\frac{630}{450}(1 + \sin(15°)) + \sin(15°)}{\sin(80°)} = 2.05$$

Such an optical index for the waveguide is very high and not compatible with current low-cost materials. Moreover, the diffraction gratings are in optical contact with the waveguide and must also be manufactured in this very high index material, which enormously complicates their manufacture. Making $\underline{n} = 2.10$ to obtain a small margin leads to a line density of N=2900 lines per millimeter (lines/mm): thus the line density of the grating is high.

There are therefore severe constraints on the manufacture of such systems because it requires diffraction gratings with a high line density that are optically mounted on a waveguide having a very high index.

For an industrial solution with a waveguide in a low-cost material (glass or plastics material) and diffraction gratings replicated with transparent resins of the same index as the waveguide, this high index constraint is a problem.

The object of the invention is to provide a planar optical system for polychromatic imaging with a wide field-of-view that is preferably easier and less costly to manufacture than prior art systems.

To this end, the invention provides a planar optical system for wide angular field-of-view polychromatic imaging comprising a planar waveguide including two faces that are plane and parallel, an entry coupler including a first diffraction grating and an exit coupler including a second diffraction grating, the planar optical system being adapted to receive an incident optical beam having an optical spectrum of spectral width $\Delta\lambda$ ($\Delta\lambda=\lambda_3-\lambda_1$) and an angular field $\pm\Delta\theta$ and defining a mean angle of incidence $i_0$ with the normal to a face of the waveguide, said first grating being adapted to couple said incident beam into the planar waveguide as a beam adapted to propagate in the waveguide by total internal reflection at the faces of the waveguide, and the second grating being adapted to receive the coupled beam and to diffract said coupled beam out of the waveguide as an exit beam. According to the invention the first grating is adapted to couple an entry beam of mean angle of incidence $i_0$ in the range 30 degrees to 60 degrees into the waveguide by positive first order (+1) diffraction, said coupled beam defining an internal angle of incidence greater than the angle of total internal reflection and less than a limit angle $\gamma$, and the second grating being adapted to receive the coupled beam and to diffract it out of the waveguide by negative first order (−1) diffraction at a mean exit angle $i_1$ relative to the normal to an exit face of the waveguide in the range 30 degrees to 60 degrees.

According to particular aspects of the invention:
the first and second gratings are diffraction gratings of low line density, having a pitch greater than the wavelength of use ($\lambda_1$, $\lambda_3$);
the line density is less than 1200 lines/mm;
the refractive index of the waveguide is less than 1.65 over the spectral range [$\lambda_1$, $\lambda_3$];
the line density of the gratings is equal to N=1000 lines/mm, the refractive index of the waveguide being equal to 1.6 and the mean angle of incidence $i_0$ of the incident beam is 50 degrees, the limit angle $\gamma$ is 80 degrees, the spectral range is at least 450 nm to 630 nm and the angular field 2·$\Delta\theta$ is ±15 degrees;
the first and second diffraction gratings are placed on respective faces of the planar waveguide, the lines of the grating being disposed perpendicularly to the longitudinal direction of the waveguide;
the first and second gratings have the same line density;
the second grating has a diffraction efficiency that varies to render the optical flux uniform over the exit pupil;
the depth of modulation of the second grating varies; and
the second grating includes a thin dielectric layer deposited on the profile of the grating and having a continuously varying thickness.

According to different particular embodiments of the planar optical system of the invention:
the first diffraction grating is a reflection grating and the second grating is a reflection grating;
the first diffraction grating is a reflection grating and the second grating is a transmission grating;
the first diffraction grating is a transmission grating and the second grating is a reflection grating; or
the first diffraction grating is a transmission grating and the second grating is a transmission grating.

The invention also relates to the use of any embodiment of a planar optical system to transport a wide field-of-view polychromatic image, comprising the following steps:
directing an incident beam towards the entry coupler of the waveguide so that said incident beam defines an angle of incidence $i_0\pm\Delta\theta$ with a face of the waveguide and is diffracted by the first grating and coupled into the interior of the waveguide with an internal angle of incidence greater than the angle of total internal reflection and less than a limit angle $\gamma$ of 80 degrees, said incident beam defining a mean angle of incidence $i_0$ in the range 30 degrees to 60 degrees, having a total angular field 2*$\Delta\theta$ greater than or equal to 30 degrees, and a spectral bandwidth $\Delta\lambda$ greater than or equal to 100 nm;
guiding the coupled beam towards the exit coupler in the interior of the waveguide by total internal reflection at the internal faces of the waveguide so that the second diffraction grating receives said coupled beam and is adapted to diffract it by negative first order (−1) diffraction to extract it from the waveguide and form an exit beam;
receiving said exit beam extracted from the waveguide by diffraction at the second grating, said exit beam defining an exit angle $i_1\pm\Delta\theta'$ with a face of the waveguide (3), $i_1$ being greater than or equal to 30 degrees, and having a total angular field 2*$\Delta\theta'$ greater than or equal to 30 degrees over the spectral band $\Delta\lambda$.

In a preferred use of the optical system of the invention, the mean directions of the incident beam and of the exit beam define an angle in the range 80 degrees to 100 degrees.

The waveguide imaging system of the invention functions over a wide spectral range with a large visual field and with few constraints on the waveguide and on the manufacture of the diffraction gratings.

The principle is to use a grating with lower line density so as to have smaller angular dispersion in the waveguide for the various wavelengths.

The present invention also provides features that emerge in the course of the following description, taken in isolation or in any technically feasible combination.

The description is given by way of non-limiting example with reference to the appended drawings and explains how the invention may be put into practice:

FIG. 1 shows diagrammatically from the side a planar waveguide imaging device of the prior art and its operating principle;

FIG. 2 graph shows the minimum refractive index of the planar waveguide as a function of the mean angle of incidence $i_0$ of the entry beam relative to a normal to a face of the waveguide;

The invention provides a waveguide imaging system operating over a wide spectral band and over a large visual field but does not require the use of costly materials or treatments for the waveguide or for the manufacture of the coupling diffraction gratings.

Prior art devices use gratings of high line density so that the angle of incidence of the beam coupled into the waveguide with the plane faces of the waveguide is greater than the angle of total internal reflection.

Unlike prior art devices that use diffraction gratings of high line density for coupling the optical beams into and out of the waveguide, the device of the invention uses diffraction gratings having a low line density. This low line density advantageously enables limitation of angular dispersion in the waveguide at the various wavelengths.

However, to guide the beam coupled into the interior of the waveguide, it remains necessary for the angle of incidence of the beam coupled into the waveguide relative to the internal faces of the waveguide to remain greater than the limit angle of total reflection. Using the device inclined relative to the entry beam with a high angle of incidence makes it possible for the diffraction at the entry grating to be positive and of first order (+1) with an internal angle of incidence on the waveguide that exceeds the angle of total reflection.

There are the same total reflection and diffraction constraints with a limit internal angle of incidence $\gamma$ of approximately 80 degrees.

The parameters of the imaging system are as follows. The mean angle of incidence on the waveguide is $i_0$, the angular field is $\pm\Delta\theta$, the operating spectral band extends over $\Delta\lambda = \lambda_3 - \lambda_1$; with an angle of incidence on the waveguide less than the limit angle $\gamma$, and the following minimum and maximum line densities are obtained:

$$N_{min} = \frac{1 - \sin(i_0 - \Delta\theta)}{\lambda_1}$$

$$N_{max} = \frac{n * \sin(\gamma) - \sin(i_0 + \Delta\theta)}{\lambda_3}$$

There are solutions only if $N_{max} > N_{min}$, which yields for the refractive index $\underline{n}$ of the waveguide:

$$n \geq \frac{\frac{\lambda_3}{\lambda_1}(1 - \sin(i_0 - \Delta\theta)) + \sin(i_0 + \Delta\theta)}{\sin(\gamma)}$$

In this situation, a mean line density may be chosen:

$$N = \frac{N_{max} + N_{min}}{2}$$

Figure 1:
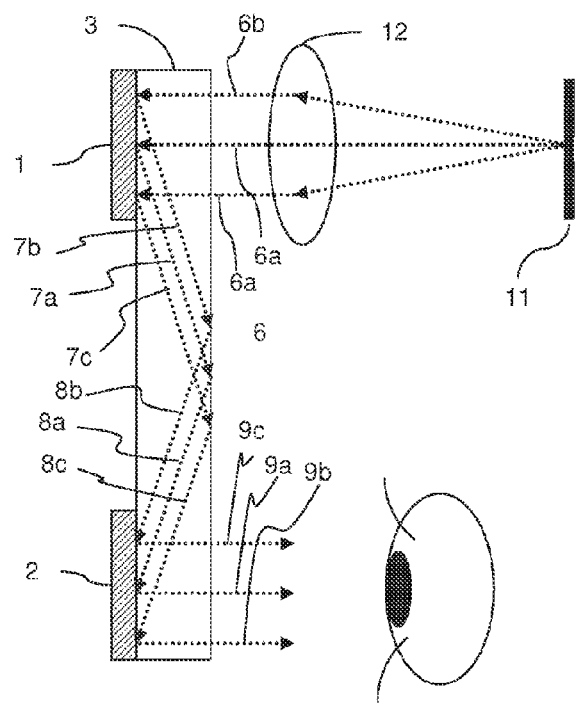
Figure 2:
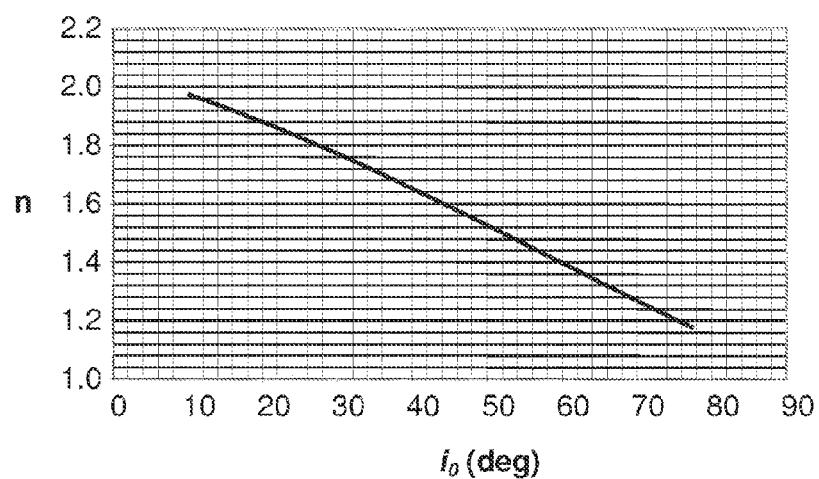

The FIG. 2 graph shows the minimum refractive index $\underline{n}$ of the planar waveguide as a function of the mean angle of incidence $i_0$ of the entry beam relative to the normal to a face of the waveguide for a full color system functioning in the visible domain from red to blue: $\lambda_1 = 450$ nm, $\lambda_2 = 630$ nm with an object angular field of $\Delta\theta = \pm 15$ degrees and a limit angle $\gamma$ equal to 80 degrees.

It is thus seen that for an angle of incidence $i_0$ of the order of 50 degrees, for example, the minimum index $\underline{n}$ is of the order of 1.55, which is a very common value for plastics materials, ordinary glass and transparent resins.

For an index $n = 1.6$ with $i_0$ equal to 50 degrees, the mean line density $N$ is 1005 lines/mm.

The use of gratings 1 and 2 of low line density combined with a high angle of incidence $i_0$ thus makes it possible to accommodate the constraints of the commonest industrial glasses, and also enables the system to be made compatible with operation over a wider spectral range. Prior art devices may operate at two close-together wavelengths, but they are not able to operate over a wide spectral range. The device of the invention makes it possible to transmit images over a wide spectral range, which makes it possible, in particular to transmit RGB color images.

For the same angular and spectral specifications, an index of 1.6 and a line density of 1005 lines/mm are required, which is much more favorable. In fact, because this line density causes much lower dispersion of the various wavelengths than a 2900 lines/mm grating, all wavelengths benefit from the phenomenon of total reflection (without loss of energy) in the interior of the waveguide. The thickness of the waveguide is generally of the order of 1 mm. The length of the waveguide is of the order of about 10 centimeters (cm) for a helmet application. The diameter of the beams and the pupil depends greatly on the presence of the entry and exit optical system (eye or optical system) and the characteristics of those optical systems.

The gratings 1 and 2 are therefore optimized to enable a beam of great spectral width and wide field-of-view to be coupled into a waveguide in a transparent material of relatively low index (<1.7).

The line density of the first grating 1 is advantageously equal to the line density of the second grating 2, which enables polychromatic operation of the imaging system.

Figure 3:
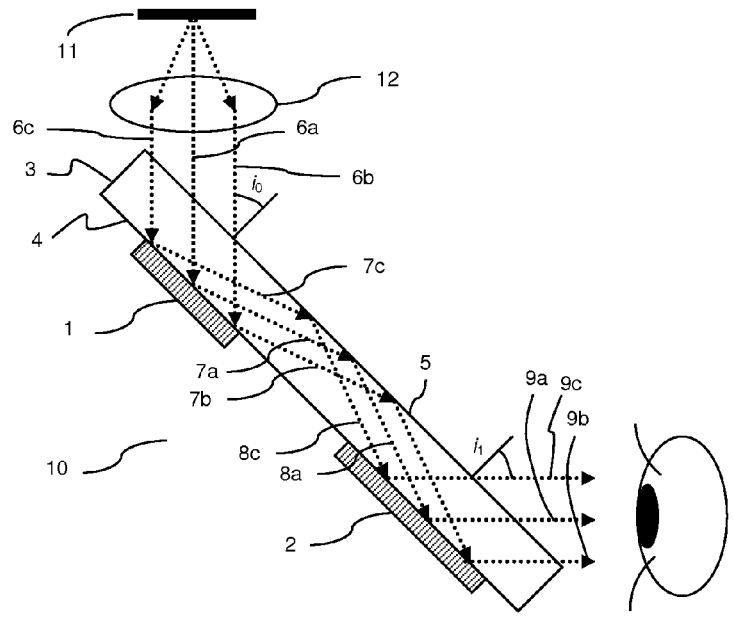
FIG. 3 shows diagrammatically from the side an imaging system of a first embodiment of the invention and its operation for a point at the center of the object field at one wavelength.

FIG. 3 shows diagrammatically a preferred embodiment of the invention and its operation for a central point of the field. The central point emits an optical beam, the optical system 12 forms the image of the object and transmits the beams 6a, 6b, 6c in the direction of the waveguide 3 and the entry grating 1. The grating 1 is a grating with a low line density that diffracts the entry beam by positive first order (+1) diffraction in such a manner that the angle of incidence of the diffracted beam 7a, 7b, 7c relative to the internal faces of the waveguide is greater than the angle of total reflection and less than the limit angle $\gamma$. The beam 7a, 7b, 7c is thus able to propagate in the longitudinal direction of the waveguide 3 by total internal reflection without attenuation. The second diffraction grating 2 is also a grating of low line density. The grating 2 receives the beams 8a, 8b, 8c and diffracts them by negative first order (−1) diffraction so that the angle of incidence of the diffracted beams is less than the angle of total reflection: the beams are then refracted and coupled to the exterior of the waveguide 3 and form the beam 9a, 9b, 9c. An optical system or the eye of the observer forms an image of the central point of the object from the beam 9a, 9b, 9c.

Figure 4:
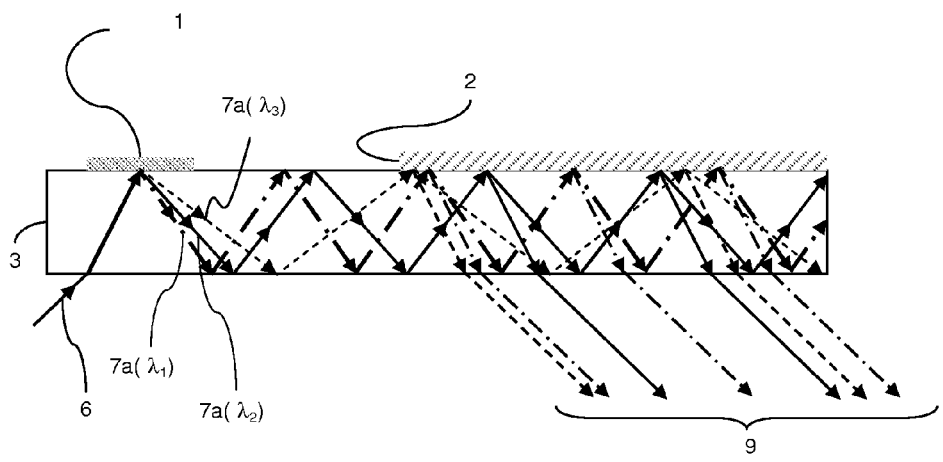
FIG. 4 shows diagrammatically the dispersion of a polychromatic beam as it propagates in an imaging system with planar waveguide and diffraction gratings.

FIG. 4 is an exaggerated representation of the angular dispersion caused by the diffraction of a polychromatic beam (composed in this example of the wavelengths $\lambda_1$, $\lambda_2$, and $\lambda_3$).

The gratings 1 and 2 induce an angular dispersion as a function of wavelength. However, since the gratings 1 and 2 are of low line density, this dispersion is reduced compared to that of systems using gratings of high line density (>2000 lines/mm). In the example shown in FIG. 4, the efficiency of the extraction grating 2 is less than the maximum in order to enable the exit beam to be extracted progressively in the longitudinal direction of the waveguide.

In FIG. 3, it should be observed that the mean direction of the entry beam 6a, 6b, 6c and the mean direction of the exit beam 9a, 9b, 9c are at an angle of approximately 90 degrees. The system thus enables the propagation direction of an optical beam to be bent. This bending between entry and exit has an additional practical advantage: it makes room for the collimator optics in a helmet-mounted system.

In most applications, the exit grating 2 in front of the eye must be transparent and ineffective in respect of light coming from the visual scene.

An exit grating 2 with efficiency that varies in the longitudinal direction of the waveguide advantageously enables the energy to be rendered uniform over the exit pupil. FIG. 4 shows diagrammatically an exit grating 2 of efficiency that varies as a function of the position in the propagation direction of the optical beam in the waveguide 3.

The first or entry waveguide 1 applies positive first order (+1) diffraction to all light beams in the waveguide above the limit angle of total reflection, thus enabling the image to be transported in the waveguide 3. In contrast, the second diffraction grating 2, with the same line density, applies negative first order (−1) diffraction so as to constitute the exit light beams and extract them from the waveguide.

In a first embodiment shown diagrammatically in FIG. 3, and at the angles at which it functions, the system is such that its exit and its entry are naturally at 90°, which offers increased integration possibilities, notably in visual helmets (pilot, infantry).

The entry diffraction grating 1 and the exit diffraction grating 2 are optimized to offer as uniform a luminous flux as possible at the exit. The exit grating 2 may be a grating with a diffraction efficiency that varies continuously to render the intensity of the exit beam uniform over the image field.

The system of the invention advantageously functions over a wide spectral range and with beams of large angular aperture. These angular and spectral constraints are looser using a design with a waveguide including two diffraction gratings of low line density functioning with a high mean angle of incidence (preferably >30°).

Figure 5:
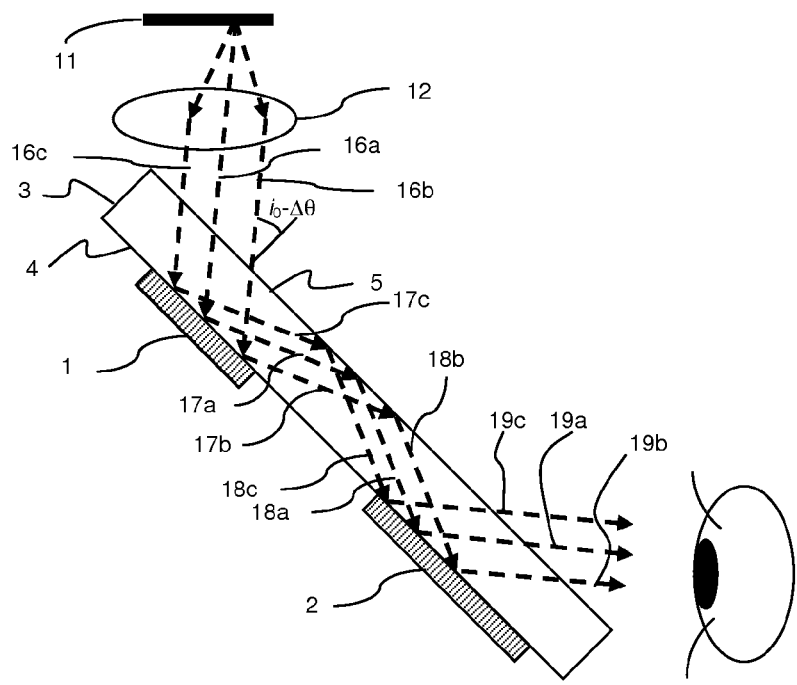
FIG. 5 shows diagrammatically the operation of an imaging system of the invention for one object field point and at one wavelength.

FIG. 5 shows diagrammatically the operation of an imaging system of the invention at one wavelength for a point of the object field. The object point here is off the axis of the lens 12. The beams 16a, 16b, 16c at the entry of the waveguide are at an angle of incidence $i_0 - \Delta\theta$ to the normal to the entry face 5 of the waveguide 3. The grating 1 is a reflection grating and diffracts the beam into the waveguide 3 to form the beam 17a, 17b, 17c that propagates by total internal reflection at the face 5 of the waveguide 3. The beam 18a, 18b, 18c as received by the grating 2 is diffracted so as to be coupled to the exterior of the waveguide as a beam 19a, 19b, 19c.

Figure 6:
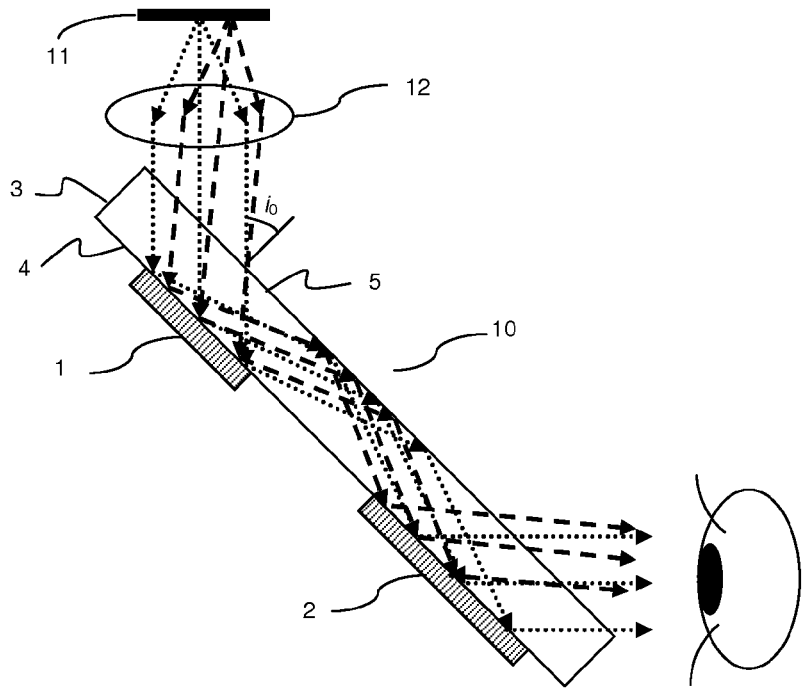
FIG. 6 shows diagrammatically the operation of an imaging system of the invention for two points of the object field and at one wavelength.

FIG. 6 shows diagrammatically the operation of the imaging system at one wavelength for two points of the object field. The two points of the object correspond to different exit directions and thus make it possible to form an image of the object via a receiver optical system (the eye of an observer or a lens and detector).

Figure 7:
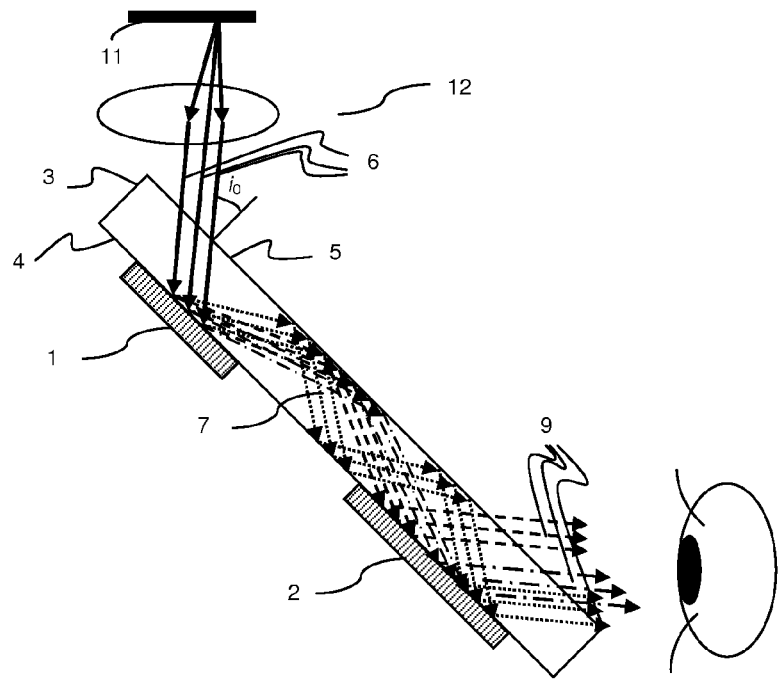
FIG. 7 shows diagrammatically the operation of an imaging system of the invention for a point off the axis of the object field at three wavelengths.

FIG. 7 shows diagrammatically the operation of a planar imaging system at three wavelengths $\lambda_1, \lambda_2, \lambda_3$ for a point off the axis of the object field. As indicated above, the low line density of the gratings 1, 2 enables the system to have a wide spectral bandwidth.

In a first preferred embodiment of the invention (FIG. 3) the entry grating 1 and the exit grating 2 of the waveguide are reflection gratings. The system of this first embodiment advantageously enables the optical path to be bent, which enables better integration of collimator optical systems in a situation of small overall size of the application (infantry or pilot helmet, virtual reality).

Figure 8:
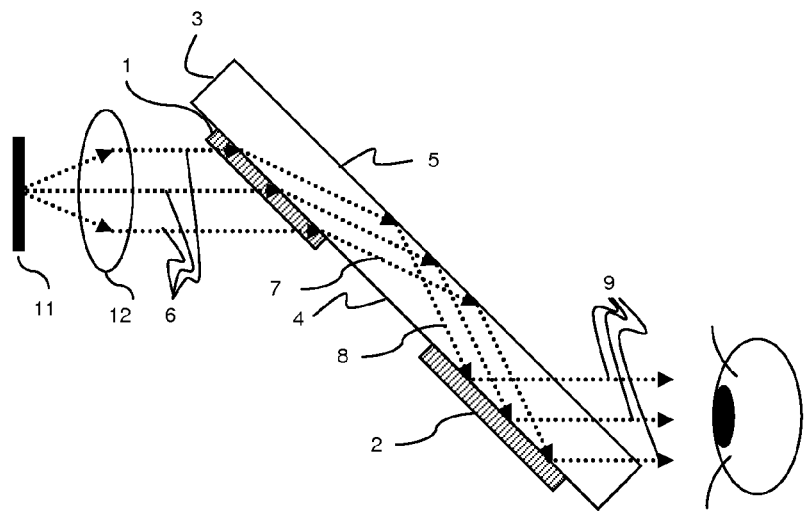
FIG. 8 shows diagrammatically from the side an imaging system of a second embodiment of the invention and its operation for a central point of the object field at one wavelength.

FIG. 8 shows diagrammatically an imaging system of a second embodiment of the invention. In this second embodiment the entry grating 1 is a transmission grating and the exit grating 2 is a reflection grating.

Figure 9:
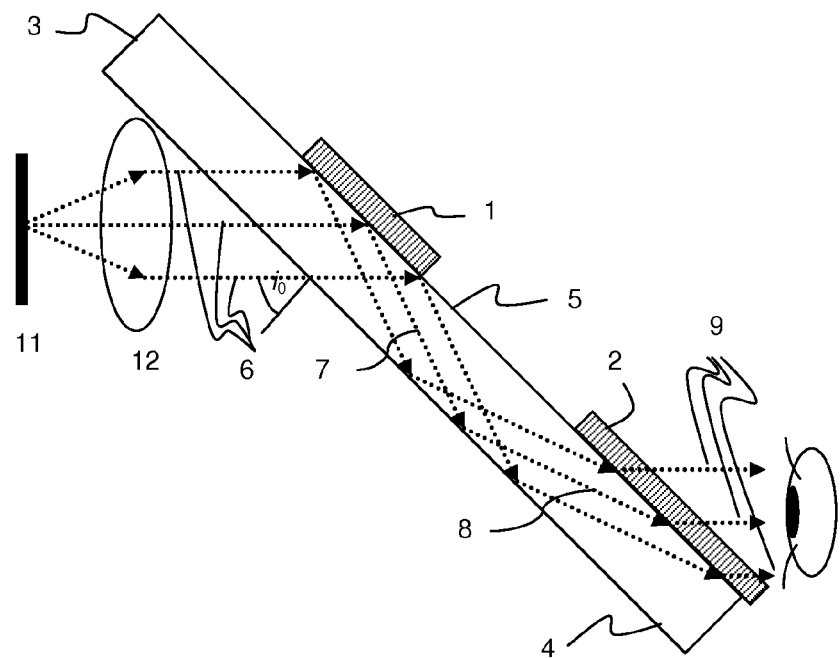
FIG. 9 shows diagrammatically an imaging system of a third embodiment of the invention and its operation for a central point of the object field at one wavelength.

In a third embodiment of the invention (FIG. 9), the grating 1 is a reflection grating and the exit grating 2 is a transmission grating.

Figure 10:
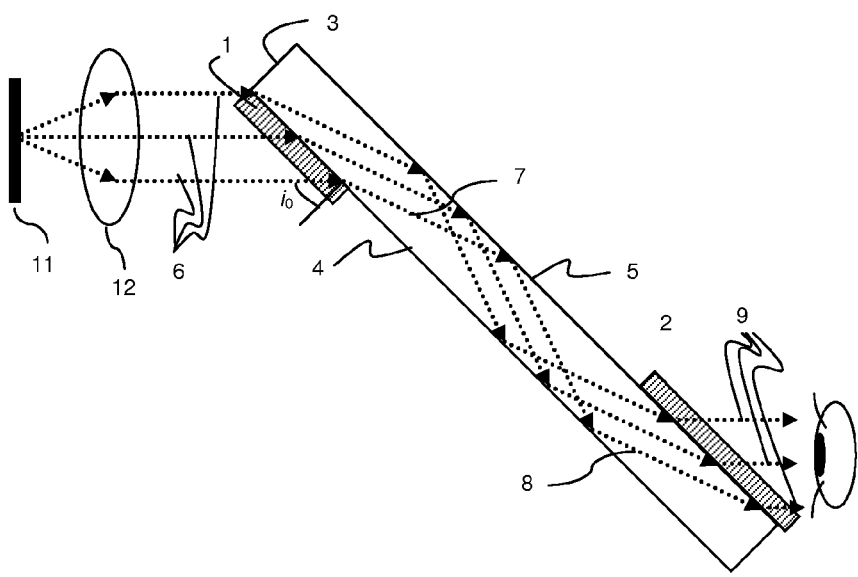
FIG. 10 shows diagrammatically an imaging system of a fourth embodiment of the invention and its operation for a central point of the object field at one wavelength.

Finally, FIG. 10 shows diagrammatically an imaging system of a fourth embodiment in which the entry grating 1 and the exit grating 2 of the waveguide are both transmission gratings.

To summarize, there is proposed a compact planar optical imaging system using a waveguide and diffraction gratings, preferably associated with collimator optics. The waveguide system is an afocal system for transporting images from collimator optics to focusing optics, in particular to the eye. The waveguide system, constituted of a waveguide and two diffraction gratings, is specifically used at an angle of incidence close to 45° in order to function over a wide spectral range (the visible spectrum) and over a large angular range, using very common materials for the waveguide and common line densities for the diffraction gratings.

The invention finds one particularly advantageous application in a head-up display in which the user can look in a single direction and see both a projected image and the surroundings. Head-up displays are used in particular for piloting airplanes, helicopters, and any other aircraft.

The invention claimed is:

1. A planar optical system (10) for wide field-of-view polychromatic imaging, consisting essentially of:
    a planar waveguide (3) consisting exclusively of a plate having two faces (4, 5) that are plane and parallel, said planar waveguide having a thickness of the order of 1 mm;
    an entry coupler consisting exclusively of a first diffraction grating (1);
    an exit coupler consisting exclusively of a second diffraction grating (2);
    the planar optical system (10) being adapted to receive an incident optical beam (6, 16) having an optical spectrum of spectral width $\Delta\lambda$ and an angular field $\pm\Delta\theta$ and defining a mean angle of incidence $i_0$ with the normal to a face (4, 5) of the waveguide (3);
    said first diffraction grating (1) being adapted to couple said incident beam (6, 16) into the planar waveguide (3) as a beam (7, 17) adapted to propagate in the waveguide (3) by total internal reflection at the faces (4, 5) of the waveguide (3), and the second diffraction grating (2) being adapted to receive the coupled beam and to diffract said coupled beam out of the waveguide as an exit beam (9, 19);
    characterized in that:
    the first and second diffraction gratings (1, 2) are diffraction gratings of low line density, having a pitch greater than the wavelength of use over a spectral range at least from 450 nm to 630 nm, the line density of the said first and second diffraction gratings (1, 2) being less than 1200 lines/mm, the waveguide (3) is in a transparent material, and the refractive index of the waveguide (3) is at least 1.55 and less than 1.65 over said spectral range at least from 450 nm to 630 nm, the first diffraction grating (1) is adapted to couple an entry beam (6, 16) over said spectral range of at least 450 nm to 630 nm, of mean angle of incidence $i_0$ in the range 30 degrees to 60 degrees and having an angular field $2*\Delta\theta$ of ±15 degrees into the waveguide (3) by positive first order (+1) diffraction, said coupled beam (7, 17, 8, 18) defining an internal angle of incidence greater than the angle of total internal reflection and less than a limit angle γ, the limit angle γ being 80 degrees and the second diffraction grating (2) being adapted to receive the coupled beam (7, 17, 8, 18) and to diffract the coupled beam by negative first order (−1) diffraction out of the waveguide (3) at a mean exit angle $i_1$ relative to the normal to an exit face (4, 5) of the waveguide (3) in the range 30 degrees to 60 degrees over said spectral range of at least 450 nm to 630 nm, and the planar optical system (10) provides wide field-of-view polychromatic imaging over said spectral range at least from 450 nm to 630 nm.

2. A planar optical system according to claim 1, characterized in that the line density of the first and second diffraction gratings (1, 2) is equal to N=1000 lines/mm, the refractive index of the waveguide (3) being equal to 1.6 over said spectral range at least 450 nm to 630 nm, and wherein the mean angle of incidence $i_0$ of the incident beam (6, 16) is 50 degrees, the limit angle γ is 80 degrees.

3. A planar optical system according to claim 1, characterized in that the first diffraction grating (1) and the second diffraction grating (2) are placed on respective faces (4, 5) of the planar waveguide (3), the lines of the first and second diffraction gratings (1, 2) being disposed perpendicularly to the longitudinal direction of the waveguide (3).

4. A planar optical system according to claim 1, characterized in that the first diffraction grating (1) and the second diffraction grating (2) have the same line density.

5. A planar optical system according to claim 1, characterized in that the second diffraction grating (2) has a diffraction efficiency that varies so as to render the optical flux uniform over the exit pupil.

6. A planar optical system according to claim 5, characterized in that a depth of modulation of the second diffraction grating (2) varies.

7. A planar optical system according to claim 5, characterized in that the second diffraction grating (2) includes a thin dielectric layer deposited on the profile of the diffraction grating (2), said thin dielectric layer having a continuously varying thickness.

8. A planar optical system according to claim 1, characterized in that the first diffraction diffraction grating (1) is a reflection grating and the second diffraction grating (2) is a reflection grating.

9. A planar optical system according to claim 1, characterized in that the first diffraction grating (1) is a reflection grating and the second diffraction grating (2) is a transmission grating.

10. A planar optical system according to claim 1, characterized in that the first diffraction grating (1) is a transmission grating and the second diffraction grating (2) is a reflection grating.

11. A planar optical system according to claim 1, characterized in that the first diffraction grating (1) is a transmission grating and the second diffraction grating (2) is a transmission grating.

12. A planar optical system according to claim 1, wherein said planar waveguide consists of a glass plate.

13. A planar optical system according to claim 1, wherein the thickness of said plate constituting said planar waveguide (3) is 1 mm.

14. A planar optical system according to claim 12, wherein the thickness of said plate constituting said planar waveguide (3) is 1 mm.

* * * * *